(12) United States Patent
Yagyu et al.

(10) Patent No.: US 8,249,578 B2
(45) Date of Patent: Aug. 21, 2012

(54) RADIO COMMUNICATION CONTROL DEVICE, RADIO COMMUNICATION CONTROL SYSTEM, AND RADIO COMMUNICATION CONTROL METHOD

(75) Inventors: Kengo Yagyu, Yokohama (JP); Akira Ishii, Yokosuka (JP); Shinichi Mori, Yokohama (JP); Takatoshi Sugiyama, Yokohama (JP); Tomoyuki Ohya, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1390 days.

(21) Appl. No.: 11/832,948

(22) Filed: Aug. 2, 2007

(65) Prior Publication Data
US 2008/0032684 A1 Feb. 7, 2008

(30) Foreign Application Priority Data
Aug. 7, 2006 (JP) ................ P2006-214761

(51) Int. Cl.
*H04M 3/00* (2006.01)
(52) U.S. Cl. ......... 455/420; 455/436; 455/437; 455/438
(58) Field of Classification Search .................. 455/420, 455/436–438
See application file for complete search history.

(56) References Cited

U.S. PATENT DOCUMENTS

| 6,418,322 | B1 | 7/2002 | Kim et al. |
| 6,529,733 | B1* | 3/2003 | Qing-An ................. 455/437 |
| 6,546,058 | B1 | 4/2003 | Gilhousen et al. |
| 7,450,904 | B2 | 11/2008 | Cave et al. |
| 7,796,988 | B2 | 9/2010 | Cave et al. |
| 2002/0001292 | A1* | 1/2002 | Miyamoto .................. 370/335 |
| 2005/0070322 | A1 | 3/2005 | Tayloe et al. |
| 2005/0221828 | A1* | 10/2005 | Wakuta et al. ............. 455/437 |

FOREIGN PATENT DOCUMENTS

| CN | 1245389 A | 2/2000 |
| JP | 07-193856 | 7/1995 |
| JP | 11-317973 | 11/1999 |
| JP | 2000-151501 | 5/2000 |
| JP | 2001-078242 | 3/2001 |
| JP | 2001-223636 | 8/2001 |

(Continued)

OTHER PUBLICATIONS

Japanese Office Action dated Feb. 22, 2011.

*Primary Examiner* — Dwayne Bost
*Assistant Examiner* — Yungsang Lau
(74) *Attorney, Agent, or Firm* — Oblon, Spivak, McClelland, Maier & Neustadt, L.L.P.

(57) ABSTRACT

A radio communication control device includes a radio parameter update determination portion, a transmission power value change portion and a radio parameter update portion. The radio parameter update determination portion determines whether or not to update a radio parameter relating to at least one of a communication frequency and transmission power to a new radio parameter. The transmission power value change portion performs a transmission power change process to change a transmission power value during data transmission to a radio communication station to a smaller value in stages at predetermined intervals when the radio parameter update determination portion determines to update the radio parameter to the new radio parameter. A radio parameter update portion updates the radio parameter to the new radio parameter when the transmission power value change portion changes the transmission power value to a preset lower limit or less.

17 Claims, 3 Drawing Sheets

| | FOREIGN PATENT DOCUMENTS | |
|---|---|---|
| JP | 2003-078938 | 3/2003 |
| JP | 2004-207839 | 7/2004 |
| JP | 2005-057806 | 3/2005 |
| JP | 2006-074683 | 3/2006 |
| JP | 2007-520124 | 7/2007 |
| WO | WO 98/56120 | 12/1998 |
| WO | WO 2004/045227 A1 | 5/2004 |

\* cited by examiner

RADIO COMMUNICATION CONTROL DEVICE, RADIO COMMUNICATION CONTROL SYSTEM, AND RADIO COMMUNICATION CONTROL METHOD

BACKGROUND OF THE INVENTION

1. Field of the Invention

The present invention relates to a radio communication control device, radio communication control system, and radio communication control method.

2. Related Background of the Invention

Japanese Patent Application Laid-Open No. 2004-207839 discloses a radio base station (communication control device) adopted in a radio resource management system that manages radio network quality of a plurality of radio communication operators in an integrated manner and optimally operates shared radio resources. In this radio base station, settings of radio parameters relating to communication frequencies and transmission power are changed to improve quality of radio links. When a radio parameter setting is changed, the change is made without notifying radio communication stations connected to the base station of the change of the radio parameter setting.

SUMMARY OF THE INVENTION

If a radio base station changes a setting of radio parameters relating to a communication frequency and transmission power momentarily, radio communication stations connected to the base station are set to a non-connected state and will search for and reconnect to a new connectable radio base station. In this case, a momentary interruption occurs in the radio communication stations and degrades user's convenience.

An object of the present invention is to provide a radio communication control device, radio communication control system, and radio communication control method that can prevent an occurrence of momentary interruption in radio communication stations when a communication control device changes a setting of a radio parameter relating to a communication frequency or transmission power.

A radio communication control device according to the present invention comprises: a radio parameter update determination portion for determining whether or not to update a radio parameter relating to at least one of a communication frequency and transmission power to a new radio parameter; a transmission power value change portion for performing a transmission power change process to change a transmission power value during data transmission to a radio communication station to a smaller value in stages at predetermined intervals when the radio parameter update determination portion determines to update the radio parameter to the new radio parameter; and a radio parameter update portion for updating the radio parameter to the new radio parameter when the transmission power value change portion changes the transmission power value to a preset lower limit or less.

Also, a radio communication control system according to the present invention includes a radio communication station and a radio communication control device to which the radio communication station connects, wherein the radio communication control device comprises: a radio parameter update determination portion for determining whether or not to update a radio parameter relating to at least one of a communication frequency and transmission power to a new radio parameter; a transmission power value change portion for performing a transmission power change process to change a transmission power value during data transmission to the radio communication station to a smaller value in stages at predetermined intervals when the radio parameter update determination portion determines to update the radio parameter to the new radio parameter; and a radio parameter update portion for updating the radio parameter to the new radio parameter when the transmission power value change portion changes the transmission power value to a preset lower limit or less.

Further, a radio communication control method in a radio communication control device comprises: determining whether or not to update a radio parameter relating to at least one of a communication frequency and transmission power to a new radio parameter; performing a transmission power change process to change a transmission power value during data transmission to a radio communication station to a smaller value in stages at predetermined intervals when the radio parameter is determined to be updated to the new radio parameter in the radio parameter update determination step; and updating the radio parameter to the new radio parameter when the transmission power value is changed to a preset lower limit or less in the transmission power change process.

According to the invention described above, the transmission power value during a data transmission to a radio communication station can be changed to a smaller value in stages at predetermined intervals when it is determined to update radio parameters relating to at least one of a communication frequency and the transmission power, and the radio parameters can be changed when the transmission power value is changed to a preset lower limit or less. Since the received power value of the radio communication station can thereby be reduced gradually, the radio communication station can be made to switch a radio communication control device to be connected. Therefore, the radio parameters can be updated after no radio communication stations come to connect to the radio communication control device. Consequently, a radio communication control device can prevent momentary interruption in the radio communication stations when changing a setting of the radio parameter relating to at least one of the communication frequency and transmission power.

In the radio communication control device according to the present invention, the transmission power value change portion may determine a transmission power value for a next transmission so that a ratio of the transmission power value for the next transmission to a ratio during a last transmission becomes equal to or greater than a ratio of a received power value as a condition when the radio communication station determines to be poor communication quality to a ratio as a condition when the radio communication station switches a radio communication control device to be connected, and the transmission power value change portion may set the predetermined interval for the transmission power change process longer than a time required by the radio communication station for switching the connection from a currently connected device to another radio communication control device.

Thus, the transmission power value is always set between the received power value as a condition for switching the radio communication control device and the received power value as a condition for determining to be poor communication quality in a process in which the transmission power value is reduced in stages. Therefore, in this case, the radio communication station can switch the radio communication control device to be connected before communication quality becomes poor. Moreover, by setting the change interval longer than a time required by the radio communication station to switch the radio communication control device, the radio communication station can reliably switch the radio base station when the transmission power value is changed to a value between a received power value as a threshold for switching and a received power value as a threshold for determining to be poor communication quality.

In the radio communication control device according to the present invention, the transmission power value change portion may set an update transmission power value as a transmission power value for a next transmission and terminate the transmission power change process in a case where the radio parameter update determination portion determines to update only a radio parameter relating to a transmission power, and the transmission power value for next transmission is more than the preset lower limit, and the transmission power value for the next transmission is equal to or less than the update transmission power value contained in the new radio parameter, and the radio parameter update portion may update the radio parameter to the new radio parameter when the transmission power value change portion terminates the transmission power change process.

Thus, if the update transmission power value is larger than the lower limit, the transmission power change process can be terminated when the transmission power value reaches the update transmission power value even before being changed to the lower limit or less. Accordingly, it is possible to reduce a time required for the transmission power change process.

The radio communication control device according to the present invention may further comprise: a connection state information management portion for managing connection state information relating to a connection state of the radio communication station connected to the radio communication control device; and a connected terminal existence determination portion for determining whether or not the radio communication station connected to the radio communication control device exists based on the connection state information managed by the connection state information management portion, wherein the transmission power value change portion terminates the transmission power change process when the connected terminal existence determination portion determines that no radio communication station connected to the radio communication control device exists even if the transmission power value for the next transmission is more than the preset lower limit, and wherein the radio parameter update portion updates the radio parameter to the new radio parameter when the transmission power value change portion terminates the transmission power change process.

Thus, the transmission power change process can be terminated when it is determined that no radio communication station is connected to the radio communication control device even before the transmission power value is changed to the lower limit or less. Accordingly, it is possible to reduce a time required for the transmission power change process.

The radio communication control device according to the present invention may further comprise: a communication status determination portion for determining whether or not the radio communication station connected to the radio communication control device is in a communication state based on a communication status of the radio communication station contained in the connection state information when the connected terminal existence determination portion determines that the radio communication station is connected to the radio communication control device, wherein the transmission power value change portion terminates the transmission power change process when the communication status determination portion determines that the radio communication station connected to the radio communication control device is not in a communication state even if the transmission power value for the next transmission is more than the preset lower limit.

Thus, the transmission power change process can be terminated when it is determined that the radio communication station connected to the radio communication control device is not in a communication state even before the transmission power value is changed to the lower limit or less. Accordingly, it is possible to reduce a time required for the transmission power change process.

The radio communication control device according to the present invention may further comprise: a communication type determination portion for determining whether or not a communication type of the radio communication station connected to the radio communication control device is voice communication mode based on the communication type information of the radio communication station contained in the connection state information when the connected terminal existence determination portion determines that the radio communication station is connected to the radio communication control device, wherein the transmission power value change portion terminates the transmission power change process when the communication type determination portion determines that the communication type information of the radio communication station connected to the radio communication control device is not voice communication mode even if the transmission power value for the next transmission is more than the preset lower limit.

Thus, the transmission power change process can be terminated when it is determined that a radio communication station under the voice communication mode as the communication type is not connected to the radio communication control device even before the transmission power value is changed to the lower limit or less. Accordingly, it is possible to reduce a time required for the transmission power change process.

The radio communication control device according to the present invention may further comprise: a connection state information management portion for managing connection state information relating to a connection state of the radio communication station connected to the radio communication control device; and a connection determination portion for determining whether or not a radio communication station connected to the radio communication control device when the radio parameter update determination portion determined to update the radio parameter to the new radio parameter is currently connected to any radio communication control device, based on the connection state information managed by the connection state information management portion and the connection state information managed by another radio communication control device, wherein the radio parameter update portion stops updating the radio parameter when the connection determination portion determines that the radio communication station that was connected to the radio communication control device is not connected to any radio communication control device.

Thus, whether there is any radio communication station that failed in switching the radio communication control device can be checked and, if a radio communication station that failed in switching is confirmed, the radio communication station that failed in switching can be reconnected to the radio communication control device, which is formerly connected, by stopping updating the radio parameters.

The radio communication control device according to the present invention may further comprises: a connection state information management portion for managing connection state information relating to a connection state of the radio communication station connected to the radio communication control device; and a received power value determination portion for determining whether or not the received power value of the radio communication station connected to the radio communication control device is smaller than a received power value as a condition when the radio communication station switches a radio communication control device to be connected, based on the received power value of the radio communication station contained in the connection state information managed by the connection state management portion, wherein the radio parameter update portion stops updating the radio parameter when the received power value determination portion determines that the received power value of the radio communication station connected to the radio communication control device is smaller than the received power value as the condition for switching.

Thus, it can be checked whether there is any radio communication station that has not switched the radio communication control device, though the received power value is smaller than the received power value as a condition for switching the radio communication control device. If such a radio communication station is confirmed, momentary interruption in the radio communication station can be prevented by stopping updating the radio parameters.

The radio communication control device according to the present invention may further comprises: a message transmission portion for transmitting a transmission power value increase request message requesting to increase a transmission power value to another radio communication control device; and a transmission power value increasing portion for increasing a transmission power value when receiving the transmission power value increase request message transmitted from another radio communication control device.

Thus, the transmission power value of another radio communication control device existing around the radio communication control device can be increased. Therefore, radio communication stations connected to the radio base station can be prompted to switch to another radio communication control device which has increased a transmission power value.

According to a radio communication control device, radio communication control system, and radio communication control method in the present invention, an occurrence of momentary interruption in radio communication stations can be prevented when the radio communication control device changes a setting of radio parameters relating to at least one of the communication frequency and the transmission power.

DESCRIPTION OF THE PREFERRED EMBODIMENT

Figure 1:
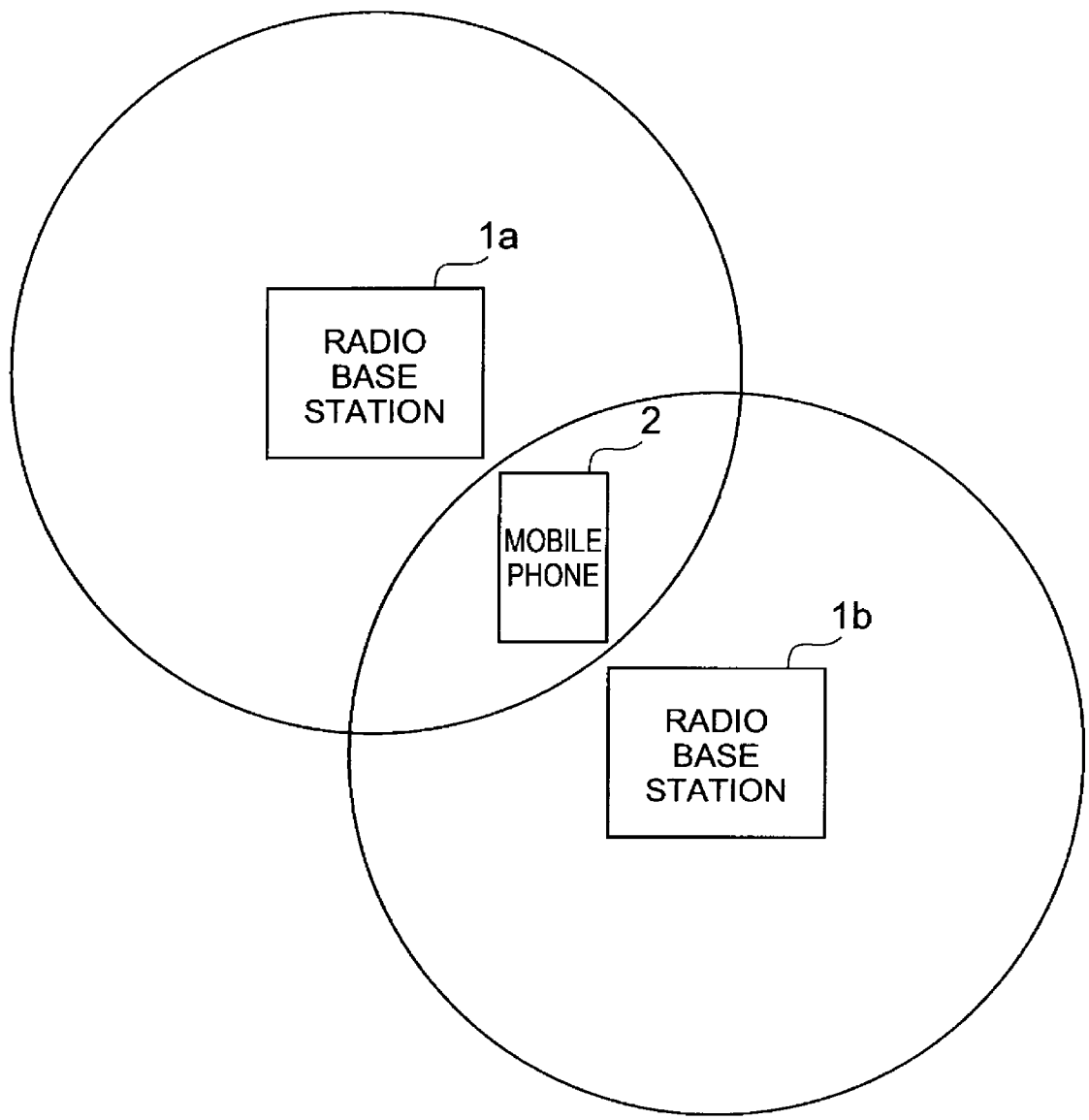
FIG. 1 is a diagram exemplifying a system configuration of a radio communication control system in accordance with an embodiment of the invention.

An embodiment of a radio communication control device, radio communication control system, and radio communication control method according to the present invention will be described below with reference to drawings. The same reference numeral is attached to the same component in each diagram to omit duplicate descriptions.

FIG. 1 is a diagram exemplifying a configuration of a radio communication control system in an embodiment. As is shown in FIG. 1, the radio communication control system comprises radio base stations 1a and 1b (radio communication control devices) and a mobile phone 2 (radio communication station). Hereinafter, when general constitutional elements and functions of the radio base station are described, the radio base station is simply referred to as "radio base station 1" without distinguishing between radio base stations 1a and 1b.

The radio base station 1 is a radio communication control device placed at an end of a mobile communication network to perform radio communication with the mobile phone 2 connected thereunder. The radio base station 1 physically includes a CPU, communication device, memory and the like.

The mobile phone 2 is a radio communication station that performs radio communication with the radio base station 1 covering a radio area in which the mobile phone 2 is located to receive a voice-call service or packet communication service. The mobile phone 2 physically includes a CPU, communication device, memory, input key, display and the like.

In the present embodiment, the radio base station 1 is used as a specific example to describe the radio communication control device. However, the specific example thereof is not limited to this and may be, for example, a radio network control device controlling a plurality of radio base stations. Also, in the present embodiment, the mobile phone 2 is used as a specific example to describe the radio communication station, but the specific example thereof is not limited to this and may be, for example, a PHS phone or a PDA having a communication function.

Figure 2:
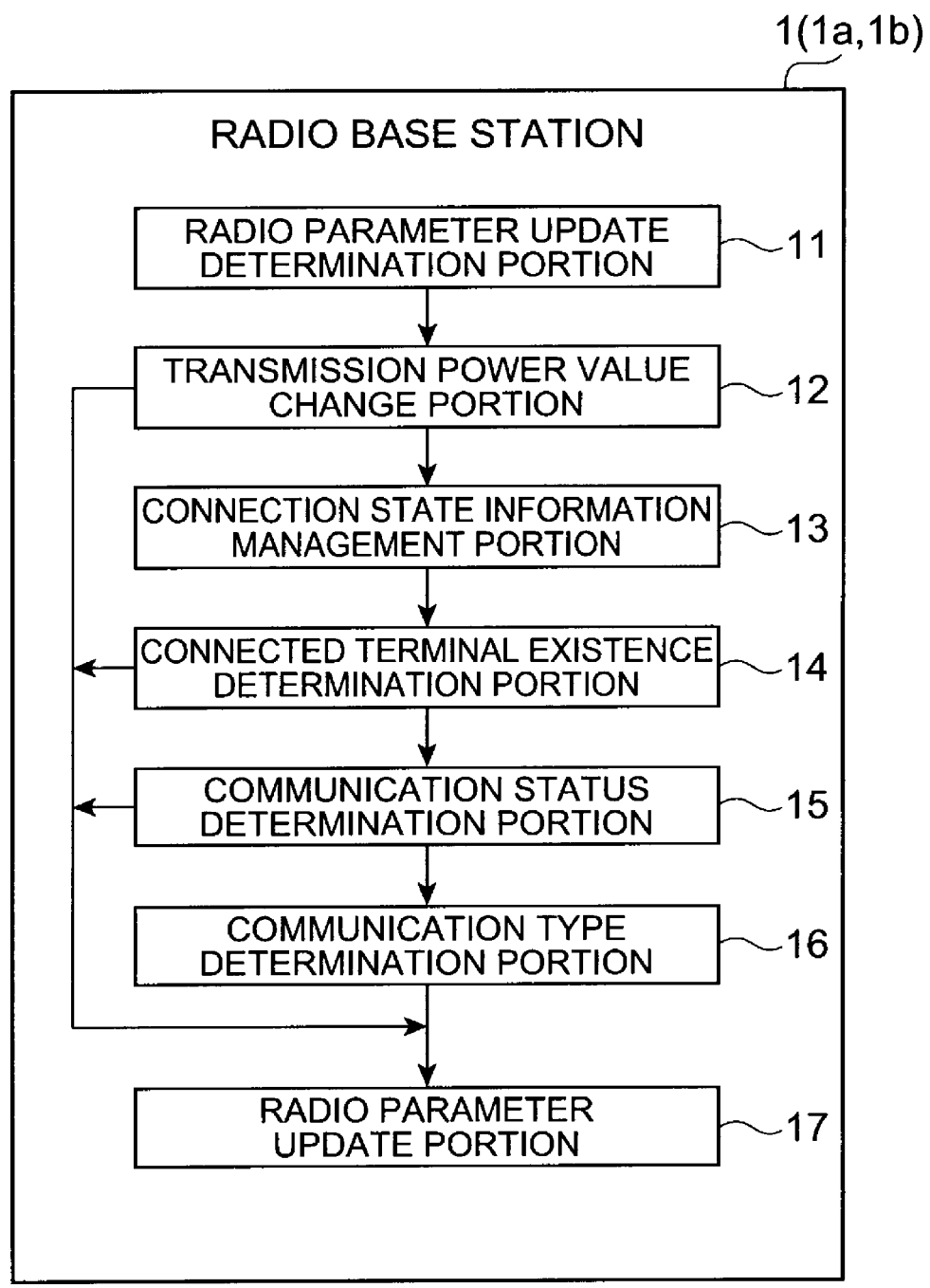
FIG. 2 is a block diagram exemplifying a functional configuration of a radio base station shown in FIG. 1.

Next, a functional configuration of the radio base station 1 will be described with reference to FIG. 2. As shown in FIG. 2, the radio base station 1 comprises a radio parameter update determination portion 11 (radio parameter update determination means), a transmission power value change portion 12 (transmission power value change means), a connection state information management portion 13 (connection state information management means), a connected terminal existence determination portion 14 (connected terminal existence determination means), a communication status determination portion 15 (communication status determination means), communication type determination portion 16 (communication type determination means), and a radio parameter update portion 17 (radio parameter update means).

The radio parameter update determination portion 11 determines whether or not to update radio parameters relating to the communication frequency and transmission power to the new radio parameters. Conditions for determining to update the radio parameters include, for example: when interference with another radio base station is detected in the radio base station; when an update request message of radio parameters transmitted from another radio base station that detected interference is received; when radio waves from another system such as a meteorological radar is detected, in which case change of the radio parameters is obliged by laws and regulations; and when an update request message of radio parameters transmitted from a management unit placed in a mobile communication network is received.

The transmission power value change portion 12 performs a transmission power change process to change the transmission power value during data transmission to the mobile phone 2 to a smaller value in stages at predetermined intervals when the radio parameter update determination portion 11 determines to update the radio parameters to the new radio parameters. The transmission power change process is performed repeatedly until the transmission power value decreases to a preset lower limit or less and terminates when the transmission power value decreases to the preset lower limit or less. Data to be transmitted to the mobile phone 2 includes, for example, communication data and control data (including broadcast information). Thus, by decreasing the transmission power value gradually, the radio base station 1 can get the mobile phone 2 switched to another radio base station 1 intentionally and therefore, momentary interruption due to change of radio parameters can be prevented.

The transmission power value change portion 12 calculates a transmission power value P2 to be changed to a smaller value in stages in the transmission power change process using Equation (1) shown below:

$$P2 >= P1 \cdot P4/P3 \qquad \text{Equation (1)}$$

where, P1 in Equation (1) is a transmission power value [dBm] during last transmission and P2 is a transmission power value [dBm] for next transmission. P3 is a received power value as a condition for the mobile phone 2 to switch the radio base station 1 to be connected and P4 is a received power value as a condition for the mobile phone 2 to determine to be poor communication quality. Therefore, Equation (1) is an equation expressing that the transmission power value for next transmission P2 is equal to or greater than a value obtained by dividing a product of the transmission power value during last transmission P2 and the received power value P4 as a condition for the mobile phone to determine to be poor communication quality by the received power value P3 as a condition for the mobile phone to switch the radio base station connected.

In mobile communication, generally as the received power value from the radio base station 1 decreases, communication quality deteriorates and the error possibility increases in each mobile phone 2 until, when the received power value decreases to a certain level, radio communication becomes impossible. Therefore, a larger value than the received power value P4 is set as the received power value P3 to cause the mobile phone to switch the radio base station before communication quality becomes poor. Accordingly, when the received power value decreases to the received power value P3 or less, the mobile phone 2 searches for another radio base station 1 providing better communication quality, and the mobile phone 2 switches from the currently connected base station 1 to another radio base station 1.

Equation (1) is based on Equation (2) shown below.

$$P2/P1 >= P4/P3 \qquad \text{Equation (2)}$$

Equation (2) is an equation expressing that a ratio Ra of the transmission power value P2 for next transmission to the transmission power value P1 during last transmission is equal to or greater than a ratio Rb of the received power value P4 as a condition for the mobile phone 2 to determine to be poor communication quality to the received power value P3 as a condition for the mobile phone 2 to switch the connected radio base station 1.

When Equation (2) is satisfied, the transmission power value will always be set between the received power value P3 and the received power value P4 while the transmission power value is decreased in stages. Therefore, in this case, the mobile phone 2 can switch the radio base station to be connected before communication quality becomes poor. Accordingly, mobile phones connected to the radio base station can all be switched the radio base station to be connected before communication quality becomes poor.

The transmission power value change portion 12 sets a time longer than a time required for mobile phone 2 to switch from the radio base station 1 to another radio base station 1 as a change interval (predetermined interval) for changing the transmission power value in stages. Accordingly, the mobile phone 2 can reliably switch the radio base station when the transmission power value is changed to a value between the received power value P3 and received power value P4.

In a radio communication system, the above received power value P3 and received power value P4 generally take different values for each terminal constituting the system and from system to system. Thus, a system administrator may set the value of the above ratio Rb (Rb=P4/P3) by taking performance and the like of mobile phones constituting the system into consideration. In this case, a maximum value of the ratios Rb of each mobile phone 2 may be set or an average value of the ratios Rb of all mobile phones constituting the system may be set.

The connection state information management portion 13 manages connection state information relating to the connection state of the mobile phone 2 connected to the radio base station 1. The connection state information includes, for example, address information, received power information, communication status, and the communication type information of the mobile phone 2 connected to the radio base station 1.

The address information of the mobile phone 2 currently connected to the radio base station 1 is stored as the address information of the connection state information. Thus, for example, the address information of the mobile phone 2 released from the connection with the radio base station 1 and the address information of the mobile phone 2 after a lapse of a predetermined time from the time of last communication with the radio base station 1 are excluded from storage targets.

The received power information of the connection state information is managed by receiving the current received power value transmitted from the mobile phone 2 connected to the radio base station 1. The received power value of the mobile phone 2 may be the received power value during data communication mode or the received power value of broadcast information broadcasted from the radio base station 1.

The communication status of the connection state information includes information about whether or not currently in a communication state. Whether or not in a communication state is determined by whether or not a predetermined time has elapsed after the time of last communication with the radio base station 1. That is, if the predetermined time has elapsed after the time of last communication, the mobile phone 2 is determined to be not in a communication state and, if the predetermined time has not elapsed after the time of last communication, the mobile phone 2 is determined to be in a communication state.

The communication type information of the connection state information includes, for example, data communication mode and voice communication mode. One example of how to determine the communication type will be described below. For example, if a packet size of communication data is several hundreds of bytes and a communication cycle is constant with about several tens [ms] to 100 [ms], the communication type is determined to be voice communication mode, and otherwise, the communication type is determined to be data communication mode. If an AC value in a QoS Control field of the IEEE802.11e standard contained in a frame is Vo, the communication type is determined to be voice communication mode, and otherwise, the communication type is determined to be data communication mode. Also, if a DSCP value in payload of an IP packet is EF, the communication type is determined to be voice communication mode, and otherwise, the communication type is determined to be data communication mode. Further, a field may be provided in an IP packet or a frame of IEEE802.11 to store information indicating the communication type and whether or not delay is allowed, and to determine the communication type using this information. The communication type is however not limited to distinguishing between voice communication mode and data communication mode. For example, it may be possible to distinguish between communication in which delay is not allowed such as voice communication mode and communication in which delay is allowed such as data communication mode.

The connection state information management portion 13 further determines, using the above connection state information, whether or not a mobile phone that had been connected to the currently-connected radio base station moved to another radio communication base station. More specifically, when the radio parameter update determination portion 11 determines to update the radio parameters, the connection state information management portion 13 stores, as history information, address information of mobile phones connected to the radio base station when the determination is made. By comparing the stored history information and the current address information, the connection state information management portion 13 determines whether or not any mobile phone has moved from the currently connected radio base station to another radio base station. The connection state information management portion 13 may also determine whether or not any mobile phone has moved from the currently connected radio base station 1 (for example, radio base station 1*a*) to another radio base station 1 (for example, radio base station 1*b*) by acquiring address information of the connection state information managed by the other radio base station from the other radio base station and comparing the acquired address information and the above stored history information.

The connected terminal existence determination portion 14 determines whether or not any mobile phone 2 connects to the radio base station 1 based on the connection state information managed by the connection state information management portion 13. Here, the transmission power value change portion 12 described above terminates a transmission power change process when the connected terminal existence determination portion 14 determines that no mobile phone 2 is connected to the radio base station 1 even if the transmission power value for next transmission has not reached the preset lower limit or less.

The communication status determination portion 15 determines whether or not the mobile phone 2 connected to the radio base station 1 is in a communication state when the connected terminal existence determination portion 14 determines that the mobile phone 2 connects to the radio base station 1. Here, the transmission power value change portion 12 described above terminates the transmission power change process when the communication status determination portion 15 determines that the mobile phone 2 connected to the own radio base station 1 is not in a communication state even if the transmission power value for next transmission has not reached the preset lower limit or less.

The communication type determination portion 16 determines whether or not the communication type of the mobile phone 2 connected to the radio base station 1 is voice communication mode when the connected terminal existence determination portion 14 determines that the mobile phone 2 connected to the radio base station 1 exists. Here, the transmission power value change portion 12 described above terminates the transmission power change process when the communication type determination portion 16 determines that the communication type information of the mobile phone 2 connected to the radio base station 1 is not voice communication mode even if the transmission power value for next transmission has not reached the preset lower limit or less.

The radio parameter update portion 17 updates radio parameters to the new radio parameters when the transmission power change process by the transmission power value change portion 12 terminates.

Figure 3:
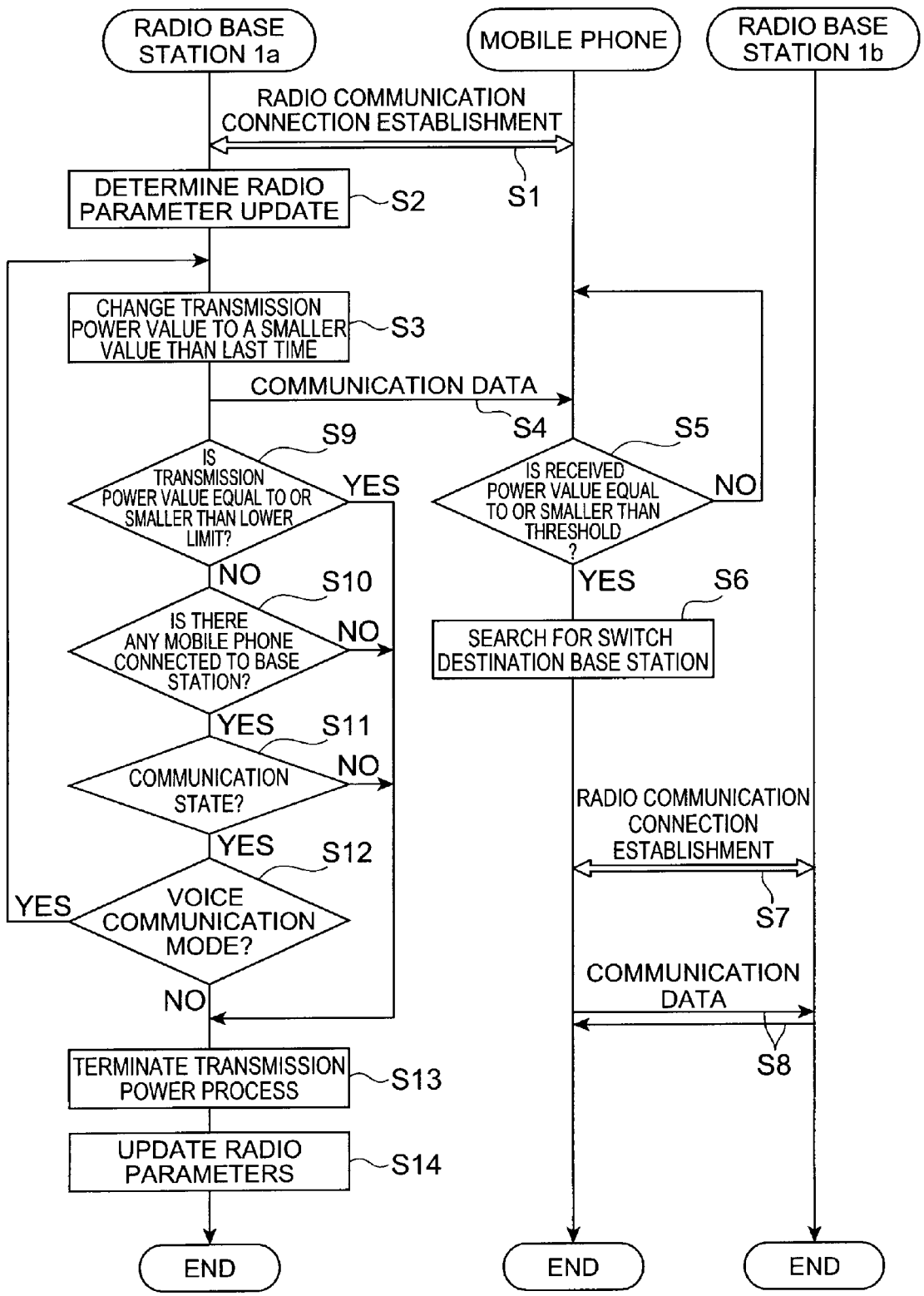
FIG. 3 is a sequence chart exemplifying operations of the radio communication control system.

Next, operations of a radio communication control system in the present embodiment will be described with reference to FIG. 3.

First, connection of radio communication between the mobile phone 2 and the radio base station 1*a* is established (step S1).

Next, if, for example, interference with another radio base station is detected in the radio base station, the radio parameter update determination portion 11 in the radio base station 1*a* determines to update the radio parameters relating to the communication frequency and transmission power to the new radio parameters (step S2). The transmission power change process by the transmission power value change portion 12 in the radio base station 1*a* is thereby started.

Next, the transmission power value change portion 12 in the radio base station 1*a* changes the transmission power value for next data transmission to the mobile phone 2 to a smaller value than the transmission power value during last transmission (step S3). Accordingly, communication data is transmitted with the changed transmission power value from the radio base station 1*a* to the mobile phone (step S4).

Next, the mobile phone 2 measures a received power value of the communication data received from the radio base station 1*a* to determine whether or not the received power value is equal to or less than the threshold for switching the radio base station connected (step S5). If this determination is NO (step S5: NO), the mobile phone 2 repeats this determination process each time the mobile phone 2 receives communication data from the radio base station 1*a*.

If, on the other hand, it is determined in step S5 that the measured received power value is equal to or less than the threshold (step S5: YES), the mobile phone 2 searches for a radio base station to be switched to (step S6). If the new radio base station 1*b* is searched, the mobile phone 2 switches the radio base station connected from the radio base station 1*a* to the radio base station 1*b* and establishes connection of radio communication with the radio base station 1*b* (step S7). Then, communication data is exchanged between the mobile phone 2 and the radio base station 1*b* (step S8).

In the above step S4, the transmission power value change portion 12 in the radio base station 1*a* that transmitted communication data to the mobile phone 2 with the changed transmission power value calculates the next transmission power value and determines whether or not the calculated transmission power value is equal to or less than the preset lower limit (step S9). If this determination is YES (step S9: YES), processing jumps to step S13, which is described later.

If, on the other hand, it is determined in step S9 that the calculated transmission power value is larger than the lower limit (step S9: NO), the connected terminal existence determination portion 14 determines whether or not any mobile phone 2 connects to the radio base station 1*a* based on connection state information managed by the connection state information management portion 13 (step S10). If this determination is NO (step S10: NO), processing jumps to step S13, which is described later.

If, on the other hand, it is determined in step S10 that the mobile phone 2 connects to the radio base station 1*a* (step S10: YES), the communication status determination portion 15 determines whether or not the mobile phone 2 connected to the radio base station 1a is in a communication state (step S11). If this determination is NO (step S11: NO), processing jumps to step S13, which is described later.

If, on the other hand, it is determined in step S11 that the mobile phone 2 connected to the radio base station 1a is in a communication state (step S11: YES), the communication type determination portion 16 determines whether or not the communication type information of the mobile phone 2 connected to the own radio base station 1 is voice communication mode (step S12). If this determination is YES (step S12: YES), processing jumps to step S3, which is described above.

If, on the other hand, it is determined in step S12 that the communication type information of the mobile phone 2 connected to the radio base station 1a is not voice communication mode (step S12: NO), the transmission power value change portion 12 terminates the transmission power change process (step S13).

Next, the radio parameter update portion 17 updates the radio parameters to the new radio parameters (step S14).

According to the radio communication control system of the present embodiment, as described above, the radio communication control system includes the radio parameter update determination portion 11, the transmission power value change portion 12, and the radio parameter update portion 17. Accordingly, the transmission power value during a data transmission to the mobile phone 2 can be changed to a smaller value in stages at predetermined intervals when it is determined to update the radio parameters relating to at least one of the communication frequency and the transmission power, and the radio parameters can be updated when the transmission power value is changed to the preset lower limit or less. Since the received power value of the mobile phone 2 can thereby be reduced gradually, the radio base station 1a can get the mobile phone 2 switched to another radio base station 1b intentionally. Therefore, the radio parameters can be updated in the radio base station 1 after no mobile phone 2 came to connect to the radio base station 1. Consequently, the radio base station 1 can prevent momentary interruption in the mobile phone 2 when changing a setting of the radio parameter relating to at least one of the communication frequency and transmission power.

Moreover, since the radio communication control system further includes the connection state information management portion 13 and the connected terminal existence determination portion 14, the transmission power change process can be terminated when it is determined that no mobile phone 2 is connected to the radio base station 1 even before the transmission power value is changed to the lower limit or less. Accordingly, it is possible to reduce a time required for the transmission power change process.

Moreover, since the radio communication control system further includes the communication status determination portion 15, the transmission power change process can be terminated when it is determined that the mobile phone 2 connected to the radio base station 1 is not in a communication state even before the transmission power value is changed to the lower limit or less. Accordingly, it is possible to reduce a time required for the transmission power change process.

Moreover, since the radio communication control system further includes the communication type determination portion 16, the transmission power change process can be terminated when it is determined that a mobile phone 2 communicating under the voice communication mode as the communication type is not connected to the radio base station 1 even before the transmission power value is changed to the lower limit or less. Accordingly, it is possible to reduce a time required for the transmission power change process.

As mentioned above, the radio parameter update determination portion 11 may determine to update a radio parameter relating to one of a communication frequency and transmission power. In a case where the radio parameter update determination portion 11 determines to update only a radio parameter relating to transmission power, the transmission power value change portion 12 may set the transmission power value for a next transmission to an update transmission power value and terminate the transmission power change process if the transmission power value for next transmission is equal to or less than the transmission power value contained in update radio parameters. This setting by the transmission power value change portion 12 and termination of the transmission power change process may be performed even if the transmission power value for next transmission has not reached the preset lower limit or less.

In other words, the transmission power value change portion 12 sets an update transmission power value as a transmission power value for the next transmission and terminates the transmission power change process in a case where the radio parameter update determination portion 12 determines to update only a radio parameter relating to a transmission power, and the transmission power value for the next transmission is more than the preset lower limit, and the transmission power value for the next transmission is equal to or less than the update transmission power value contained in the new radio parameter. Due to this, if the update transmission power value is larger than the lower limit, the transmission power change process can thereby be terminated when the transmission power value reaches the update transmission power value even before being changed to the lower limit or less. Accordingly, it is possible to reduce a time required for the transmission power change process.

In addition to each portion described above, the radio base station 1 may further comprise a connection determination portion (connection determination means) for determining, among the mobile phones 2 that were connected to the radio base station 1, existence of the mobile phones 2 that are not connected to any radio base station during transmission power change process. More specifically, the connection determination portion determines whether or not the mobile phones 2 that were connected to the radio base station when the radio parameter update determination portion 11 determined to update the radio parameters to the new radio parameters are currently connected to any radio base station based on connection state information managed by the connection state information management portion 13 and connection state information managed by other radio base station. If, in this case, the connection determination portion determines that the mobile phones that were connected to the radio base station are not connected to any radio base station, the radio parameter update portion 17 stops updating the radio parameters.

Whether there is any mobile phone that failed in switching the radio base station can thereby be checked and, if a mobile phone that failed in switching is confirmed, the mobile phone that failed in switching can be reconnected to the radio base station by stopping updating the radio parameters.

In addition to each portion described above, the radio base station 1 may further comprise a received power value determination portion (received power value determination means) for determining, among the mobile phones 2 that are connected to the radio base station, existence of the mobile phones 2 that are connected with a received power value smaller than a received power value as a condition for switching a radio base station to be connected. More specifically, the received power value determination portion determines whether or not the received power value of the mobile phones connected to the radio base station is a value smaller than the received power value as a condition for a mobile phone to switch a radio base station to be connected based on received power information contained in connection state information managed by the connection state information management portion 13. If, in this case, the received power value determination portion determines that the received power value of the mobile phones connected to the radio base station is a value smaller than a received power value as a condition for switching the radio base station to be connected, the radio parameter update portion 17 stops updating the radio parameters.

Whether there is any mobile phone that has not switched the radio base station, though the received power value is smaller than the received power value as the condition for switching the radio base station, can thereby be checked. If such a mobile phone is confirmed, momentary interruption in the mobile phone can be prevented by stopping updating the radio parameters.

In addition to each portion described above, the radio base station 1 may further comprise a message transmission portion (message transmission means) for transmitting a transmission power value increase request message requesting to increase the transmission power value to radio base station therearound and a transmission power increasing portion (transmission power increasing means) for increasing the transmission power value when a transmission power value increase request message transmitted from another radio base station is received.

The transmission power value of other radio base stations existing around the currently connected radio base station can thereby be increased and therefore, the possibility is improved that a connection destination of mobile phones connected to the currently connected radio base station can be switched to another radio base station.

The present invention has been described by applying the present invention to a mobile communication network consisting of radio base stations and mobile phones, but the network to which the present invention is applied is not limited to this. For example, the present invention can be applied to an autonomous/distributed network without hierarchical order among nodes such as a mesh network and ad-hoc network, and also to a wireless LAN.

What is claimed is:

1. A radio communication control device comprising:
   a radio parameter update determination portion for determining whether or not to update a radio parameter relating to at least one of a communication frequency and transmission power to a new radio parameter, wherein the update of the radio parameter requires an interruption in communication with a radio communication station that communicates with the radio communication control device;
   a transmission power value change portion for performing a transmission power change process to change a transmission power value during data transmission to the radio communication station to a smaller value in stages at predetermined intervals when the radio parameter update determination portion determines to update the radio parameter to the new radio parameter; and
   a radio parameter update portion for updating the radio parameter to the new radio parameter when the transmission power value change portion changes the transmission power value to a preset lower limit or less.

2. The radio communication control device according to claim 1,
   wherein the transmission power value change portion determines a transmission power value for a next transmission so that a ratio of the transmission power value for the next transmission to a ratio during a last transmission becomes equal to or greater than a ratio of a received power value as a condition when the radio communication station determines to be poor communication quality to a ratio as a condition when the radio communication station switches a radio communication control device to be connected, and
   the transmission power value change portion sets the predetermined interval for the transmission power change process longer than a time required by the radio communication station for switching the connection from a currently connected device to another radio communication control device.

3. The radio communication control device according to claim 1,
   wherein the transmission power value change portion sets an update transmission power value as a transmission power value for a next transmission and terminates the transmission power change process in a case where the radio parameter update determination portion determines to update only a radio parameter relating to a transmission power, and the transmission power value for the next transmission is more than the preset lower limit, and the transmission power value for the next transmission is equal to or less than the update transmission power value contained in the new radio parameter, and
   wherein the radio parameter update portion updates the radio parameter to the new radio parameter when the transmission power value change portion terminates the transmission power change process.

4. The radio communication control device according to claim 1, further comprising:
   a connection state information management portion for managing connection state information relating to a connection state of the radio communication station connected to the radio communication control device; and
   a connected terminal existence determination portion for determining whether or not the radio communication station connected to the radio communication control device exists based on the connection state information managed by the connection state information management portion,
   wherein the transmission power value change portion terminates the transmission power change process when the connected terminal existence determination portion determines that no radio communication station connected to the radio communication control device exists even if the transmission power value for the next transmission is more than the preset lower limit, and
   wherein the radio parameter update portion updates the radio parameter to the new radio parameter when the transmission power value change portion terminates the transmission power change process.

5. The radio communication control device according to claim 4, further comprising a communication status determination portion for determining whether or not the radio communication station connected to the radio communication control device is in a communication state based on a communication status of the radio communication station contained in the connection state information when the connected terminal existence determination portion determines that the radio communication station is connected to the radio communication control device, wherein the transmission power value change portion terminates the transmission power change process when the communication status determination portion determines that the radio communication station connected to the radio communication control device is not in a communication state even if the transmission power value for the next transmission is more than the preset lower limit.

6. The radio communication control device according to claim 4, further comprising a communication type determination portion for determining whether or not a communication type of the radio communication station connected to the radio communication control device is voice communication mode based on the communication type information of the radio communication station contained in the connection state information when the connected terminal existence determination portion determines that the radio communication station is connected to the radio communication control device, wherein the transmission power value change portion terminates the transmission power change process when the communication type determination portion determines that the communication type information of the radio communication station connected to the radio communication control device is not voice communication mode even if the transmission power value for the next transmission is more than the preset lower limit.

7. The radio communication control device according to claim 1, further comprising:

a connection state information management portion for managing connection state information relating to a connection state of the radio communication station connected to the radio communication control device; and a connection determination portion for determining whether or not a radio communication station connected to the radio communication control device when the radio parameter update determination portion determined to update the radio parameter to the new radio parameter is currently connected to any radio communication control device, based on the connection state information managed by the connection state information management portion and the connection state information managed by another radio communication control device, wherein the radio parameter update portion stops updating the radio parameter when the connection determination portion determines that the radio communication station that was connected to the radio communication control device is not connected to any radio communication control device.

8. The radio communication control device according to claim 1, further comprising:

a connection state information management portion for managing connection state information relating to a connection state of the radio communication station connected to the radio communication control device; and a received power value determination portion for determining whether or not the received power value of the radio communication station connected to the radio communication control device is smaller than a received power value as a condition when the radio communication station switches a radio communication control device to be connected, based on the received power value of the radio communication station contained in the connection state information managed by the connection state management portion, wherein the radio parameter update portion stops updating the radio parameter when the received power value determination portion determines that the received power value of the radio communication station connected to the radio communication control device is smaller than the received power value as the condition for switching.

9. The radio communication control device according to claim 1, further comprising:

a message transmission portion for transmitting a transmission power value increase request message requesting to increase a transmission power value to another radio communication control device; and a transmission power value increasing portion for increasing a transmission power value when receiving the transmission power value increase request message transmitted from another radio communication control device.

10. The radio communication control device according to claim 1, wherein the transmission power value change means is adapted to perform the transmission power change process to reduce in stages the transmission power value during data transmission to the radio communication station to a value that is smaller than a condition value for the radio communication station to switch a destination device.

11. The radio communication control device according to claim 10, wherein, while the transmission power value is reduced in stages, the transmission power value is set between the condition value for the radio communication station to switch a destination device and a condition value for the radio communication station to determine to be poor communication quality.

12. A radio communication control system including a radio communication station and a radio communication control device to which the radio communication station connects, wherein the radio communication control device comprises:

a radio parameter update determination portion for determining whether or not to update a radio parameter relating to at least one of a communication frequency and transmission power to a new radio parameter, wherein the update of the radio parameter requires an interruption in communication with the radio communication station;

a transmission power value change portion for performing a transmission power change process to change a transmission power value during data transmission to the radio communication station to a smaller value in stages at predetermined intervals when the radio parameter update determination portion determines to update the radio parameter to the new radio parameter; and a radio parameter update portion for updating the radio parameter to the new radio parameter when the transmission power value change portion changes the transmission power value to a preset lower limit or less.

13. A radio communication control method in a radio communication control device, comprising:

determining whether or not to update a radio parameter relating to at least one of a communication frequency and transmission power to a new radio parameter, wherein the update of the radio parameter requires an interruption in communication with a radio communication station that communicates with the radio communication control device;

performing a transmission power change process to change a transmission power value during data transmission to the radio communication station to a smaller value in stages at predetermined intervals when the radio parameter is determined to be updated to the new radio parameter in the radio parameter update determination step; and updating the radio parameter to the new radio parameter when the transmission power value is changed to a preset lower limit or less in the transmission power change process.

14. The radio communication control system according to claim 12, wherein the transmission power value change means is adapted to perform the transmission power change process to reduce in stages the transmission power value during data transmission to the radio communication station to a value that is smaller than a condition value for the radio communication station to switch a destination device.

15. The radio communication control system according to claim 14, wherein, while the transmission power value is reduced in stages, the transmission power value is set between the condition value for the radio communication station to switch a destination device and a condition value for the radio communication station to determine to be poor communication quality.

16. The radio communication control method according to claim 13, wherein the transmission power change process is performed to reduce in stages the transmission power value during data transmission to the radio communication station to a value that is smaller than a condition value for the radio communication station to switch a destination device.

17. The radio communication control method according to claim 16, wherein; while the transmission power value is reduced in stages, the transmission power value is set between the condition value for the radio communication station to switch a destination device and a condition value for the radio communication station to determine to be poor communication quality.

* * * * *